UNITED STATES PATENT OFFICE.

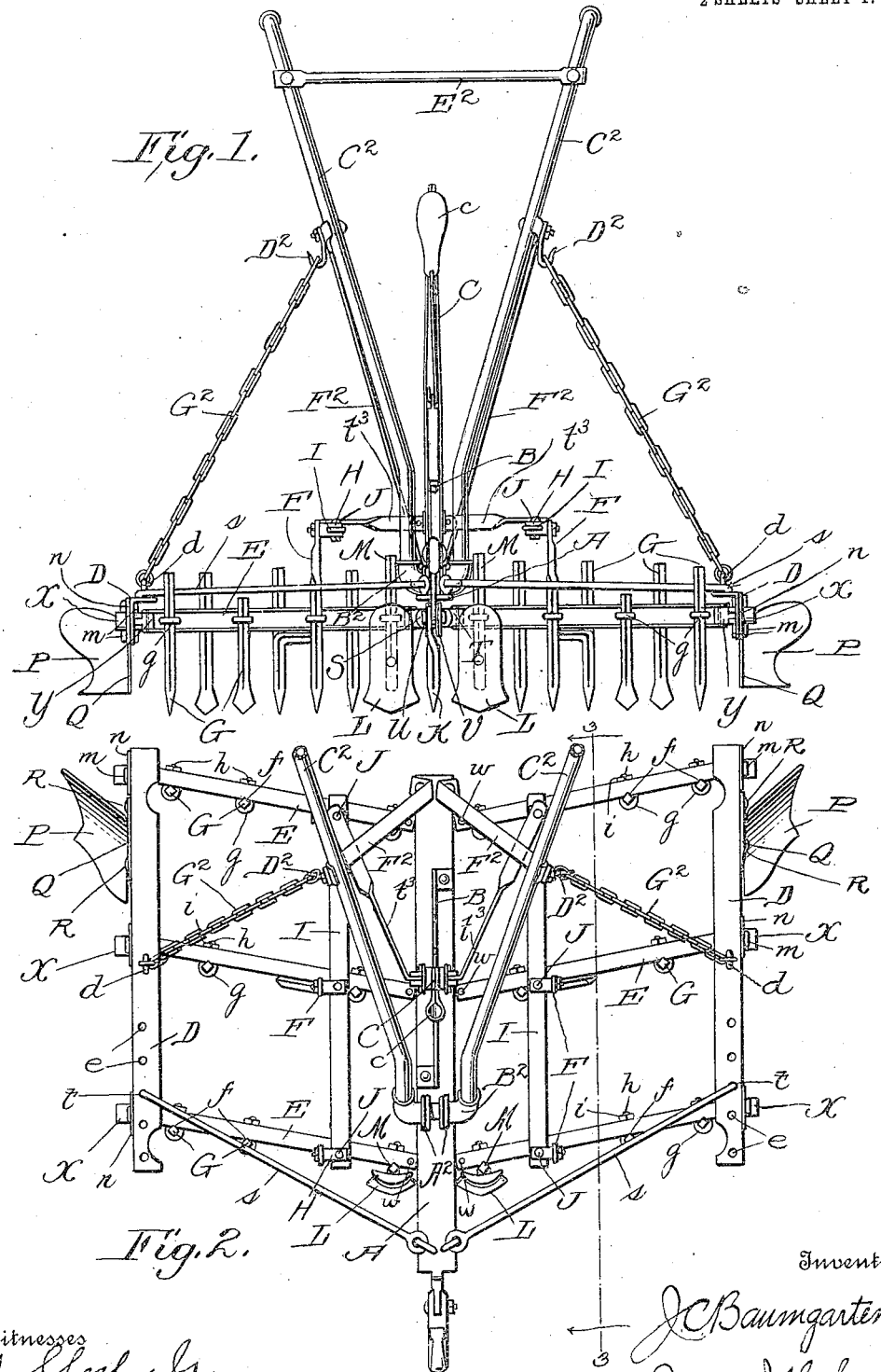

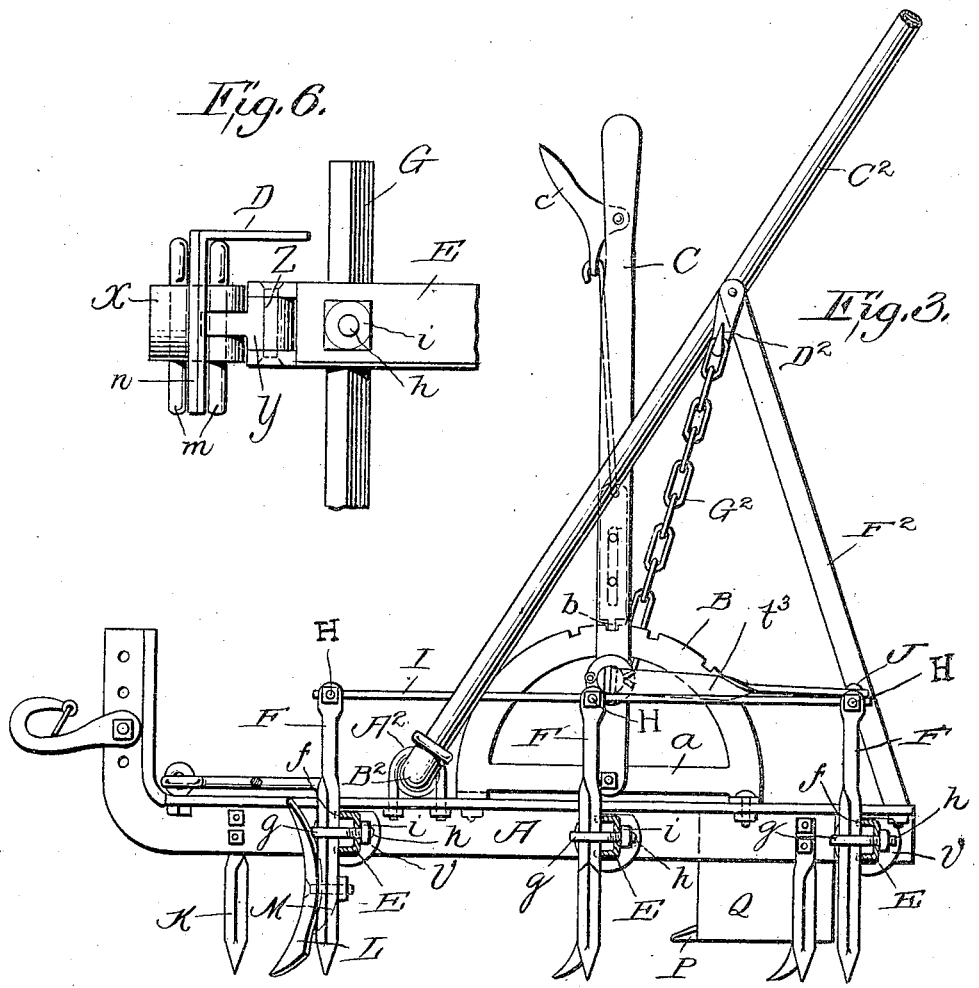

JOHAN CHRISTIAN BAUMGARTEN, OF SCHULENBURG, TEXAS.

HARROW.

942,879.

Specification of Letters Patent.   Patented Dec. 14, 1909.

Application filed July 23, 1909.   Serial No. 509,216.

*To all whom it may concern:*

Be it known that I, JOHAN CHRISTIAN BAUMGARTEN, a citizen of the United States, residing at Schulenburg, in the county of Fayette and State of Texas, have invented new and useful Improvements in Harrows, of which the following is a specification.

My invention pertains to harrows; and it has for its object to provide an efficient and durable harrow, adapted to be expeditiously and easily adjusted, and also adapted with slight adjustment to be used to advantage under different conditions.

Other objects and advantageous characteristics of the invention will be fully understood from the following description and claims when the same are considered conjunctively with the drawings, accompanying and forming part of this specification, in which:

Figure 1 is a front elevation of the harrow constituting the best practical embodiment of my invention that I have as yet devised. Fig. 2 is a plan view with the handle bars partly broken away. Fig. 3 is an enlarged, longitudinal vertical section taken in the plane indicated by the line 3—3 of Fig. 2, looking in the direction of the arrow. Fig. 4 is an enlarged detail rear elevation illustrative of the manner in which the transverse bars of the harrow are connected with the longitudinal central bar thereof. Fig. 5 is a horizontal section taken through the said connection. Fig. 6 is an enlarged detail rear elevation illustrative of the manner in which the longitudinal side bars of the harrow are connected with the outer ends of the transverse bars.

Similar letters designate corresponding parts in all of the views of the drawings, referring to which:

A is the longitudinal central bar of the harrow, which is of T-form in cross-section. On the said bar A is fixed a segmental rack B, and to the lower bar $a$ of said rack is fulcrumed a hand lever C which is positioned to swing fore and aft and is equipped with a detent $b$ for coöperating with the rack, and is also equipped with a hand lever $c$ connected in conventional manner with the detent $b$.

D D are the longitudinal side bars of the harrow which are of right-angle form in cross-section, and are equipped with eye-bolts $d$, Figs. 1 and 2, and are provided in their horizontal portions, adjacent their forward ends, with longitudinal series of vertically disposed apertures $e$.

E E are transverse bars extending between the longitudinal central bar A and the side bars D. The said transverse bars E are of channel form in cross-section, as shown in Fig. 3, and each is equipped with a single harrow tooth F and with a plurality of harrow teeth G; the harrow teeth F differing from the teeth G in that the former are provided with upwardly extending portions of greater height than the corresponding portions of the teeth G. It will also be observed by comparison of Figs. 1, 2 and 3, that the teeth F are disposed in two longitudinal rows, one row at each side of the longitudinal central bar A, and that bifurcated pins H are journaled and secured in the upper portions of the teeth F; the bifurcations in the pins being for the reception of longitudinal bars I, which are connected to the pins H by cotter pins J.

The several teeth F and G are connected with the channeled transverse bars E in the manner illustrated—that is to say, the edges of the upper and lower walls of the bars are provided with angular notches $f$, Fig. 2, to seat the teeth which are angular in cross-section, and the teeth are extended through eyes $g$ of bolts $h$, which latter extend through the vertically disposed walls of the transverse bars and are equipped with nuts $i$. Thus it will be manifest that the plurality of teeth are strongly and securely held to the transverse bars E, and yet when necessity demands any one of the teeth may be expeditiously and easily removed and replaced with a new tooth without disturbing the connections of the other teeth to the transverse bars. It will also be observed by reference to Fig. 1 that I prefer to equip the longitudinal central bar A with a tooth K, bolted or otherwise fixedly connected to the depending stem of the bar A, and that I also prefer to equip the foremost transverse bars E with shovel plows L; the said shovel plows L being carried by shanks M, which are similar in cross-section to the teeth F and G, and are similarly connected with the forward transverse bars E.

As shown in Figs. 1, 2 and 3, the side bars D are provided near their rear ends with turning plows P. The said turning plows P are disposed entirely outside the side bars D, and are provided with deep, vertically disposed inner plates Q, which plates rest alongside the vertically disposed portions of the bars E and are utilized for the passage of bolts R through the medium of which the turning plows are fixedly connected with the vertically disposed portions of the side bars D.

As will be observed by reference to Fig. 2, there is a forward pair of transverse bars E, a rear pair, and an intermediate pair, and inasmuch as all of the pairs of transverse bars E are connected with the depending stem of the longitudinal central bar A in the same manner, a detailed description of the single connection shown in Figs. 4 and 5 will suffice to impart a definite understanding of the three connections. Referring therefore to Figs. 4 and 5, it will be seen that S is a short, transverse shaft journaled in the stem of the bar A; T T are knuckles pivotally connected to the bifurcated ends of the shaft S by cotter pins $u$, or other suitable means; $v$ $v$ are washers surrounding the end portions of the shaft S and interposed between the cotter pins $u$ and the sides of the stem of bar A, in order to prevent endwise play or movement of the shaft in said stem; and $w$ $w$ are pins connecting the outer ends of the knuckles T and the inner bifurcated ends of the bars E, and disposed at right angles to the pivot or cotter pins $u$. By virtue of the employment of connections of the description just set forth between the pairs of transverse bars E and the stem of the longitudinal central bar A, it will be observed that each pair of transverse bars E is adapted to swing horizontally and forwardly and backwardly on the knuckles T, and that each pair of knuckles T is adapted to swing with each pair of transverse bars E in a direction at right angles to the fore and aft movements of the transverse bars, and in the bifurcated ends of the shaft S.

Each of the transverse bars E is connected at its outer end to one side bar D in the manner best shown in Fig. 6—that is to say, through the medium of a transverse shaft X journaled in the vertical portion of the side bar D and held against endwise play by cotter pins $m$ and a washer $n$ or other suitable means, and having a bifurcated inner end; a knuckle Y pivoted on the inner pin $m$ and in the bifurcation of the shaft X, and a pin Z extending through the outer bifurcated end of the transverse bar E and the knuckle Y and disposed parallel to the inner pin $m$. When all of the transverse bars E are connected with the side bars D in the manner stated it will be observed that the connections between the bars E and the bars D are not affected when the bars E are disposed at right angles to the bar A, or when said bars E are pitched rearwardly at various angles of inclination to the bar A. When the bars E are at right angles or at approximate right angles to the bar A, said bars D are adjustably connected with the central bar A through the medium of rods $s$, Fig. 2, having their inner ends loosely connected with the forward portion of the bar A, and also having depending terminals $t$ adapted to enter the apertures $e$ in the side bars D. When the transverse bars E are to be retained in positions at right angles to the central bar A, the depending terminals of the rods $s$ are placed in the rear apertures $e$, and it will be noted in this connection that the said terminals of the rods $s$ are placed in the forward apertures $e$ of the bars D according to the degree at which it is desired to pitch the bars E rearwardly from the longitudinal central bar A.

By reason of the connections one of which is shown in Figs. 4 and 5, it will be readily understood that the bars E may be flexed upwardly with respect to the longitudinal central bar, as when it is desired for the harrow to move in the water furrow and scrape the sides of a bed, and that the said transverse bars E may be flexed downwardly with respect to the longitudinal central bar A, as when it is desired for the harrow to straddle a ridge and operate against the sides thereof. It will be understood, however, that the said connections between the transverse bars E and the central bar A in no way diminishes the efficiency of the harrow when the same is used on level ground.

The journaling of the shafts S and X in the vertically disposed portions of the bars A and D, respectively, permits of the bars E being rocked on their axes to place the teeth at various angles to the ground; and in order to enable the harrow operator to adjustably fix the teeth at various angles to the ground, I provide the connecting bars $t^3$ intermediate the lower portion of the hand lever C and the bifurcated pins J on the rear teeth F. The two rows of teeth F each having a connecting bar I, as before described, it follows that when the rear teeth F and the rear bars E are adjusted by manipulation of the lever C, the other teeth F and bars E will be correspondingly adjusted, and that the adjustable fixing of the hand lever C to the rack B will result in the adjustable fixing of all of the transverse bars E and of all of the teeth carried thereby.

$A^2$ $A^2$, Fig. 2, are bearings carried on the forward portion of the longitudinal central bar A. $B^2$ is a coupling extending through the said bearings $A^2$. $C^2$ $C^2$ are handle bars secured at their lower and forward ends in the end portions of the coupling $B^2$ and having hooks $D^2$ at an intermediate point of their height, and also having, by preference, a connecting bar $E^2$ between their upper portions, and $F^2$ $F^2$ are brace bars extending between and connecting the handle bars C² and the rear end of the longitudinal central bar A. It will be understood from this that the longitudinal central bar A constitutes in combination with the handle bar C² and the brace bars F², what may be properly denominated the main frame of my novel harrow. G² G² are cables, preferably in the form of chains, which are connected at their lower ends to the eyes $d$ on the side bars D, and are designed to be adjustably connected with the hooks D² on the handle bars. From this it will be readily understood that when the transverse bars E are flexed upwardly from the longitudinal central bar A, said bars E may be adjustably secured in such position by adjustably connecting or engaging certain links of the cables G² with the hooks D², and that when the bars E are flexed downwardly from the longitudinal central bar A, the outer ends of the bars E may be suspended through the medium of the side bars D and the cables G² from the hooks D² on the handle bars C². Manifestly the several links in each chain or cable G² permit of the bars E being adjustably fixed at various angles of inclination either upwardly or downwardly from the bar A.

I prefer to provide the bar A with the means best shown in Fig. 3 for the attachment of draft animals, but it is obvious that draft animals may be hitched to the bar A in any other approved manner without affecting my invention.

It will be gathered from the foregoing that while simple in construction, my novel harrow is adapted to be quickly and easily adjusted to accommodate it to different conditions, and that by virtue of the described adjustment capacity of the harrow, its range of usefulness is very wide.

As before stated, the construction herein illustrated and described is the best practical embodiment of my invention of which I am cognizant, but it is obvious that in the future practice of the invention such changes or modifications may be made as do not involve departure from the scope of my invention as defined in the claims appended.

Having described my invention, what I claim and desire to secure by Letters Patent, is:

1. In a harrow, the combination with a frame comprising a longitudinal central bar, and handle bars fixed on said longitudinal central bar and having hooks, of a lever mounted on the longitudinal central bar of the frame, means for adjustably fixing the lever with respect to the frame, side bars each having a longitudinal row of apertures, rods loosely connected with the longitudinal central bar of the frame and having terminal portions positioned to enter the apertures of the side bars, transverse bars arranged at opposite sides of the longitudinal central bar and between the same and the side bars, teeth carried by said transverse bars, other teeth carried by the transverse bars and arranged in longitudinal rows at opposite sides of the longitudinal central bar, longitudinal bars connecting the teeth in said rows and disposed at opposite sides of the longitudinal central bar, bars connecting the said longitudinal bars with the lever, shafts journaled in the longitudinal central bar of the frame, shafts journaled in the side bars, knuckles interposed between the inner ends of the transverse bars and the longitudinal central bar, pintles pivotally connecting said knuckles to said shafts, pintles pivotally connecting the knuckles and the inner ends of the transverse bars and disposed at right angles to the first named pintles, knuckles interposed between the outer ends of the transverse bars and the shafts in the side bars, pintles pivotally connecting said knuckles and said shafts, pintles pivotally connecting the outer ends of the transverse bars to said knuckles, and chains connected to the side bars and adapted to be detachably connected to the hooks on the handle bars.

2. The combination in a harrow and with a frame comprising a longitudinal central bar, and handle bars fixed on said longitudinal central bar, of a lever mounted on the longitudinal central bar of the frame, means for adjustably fixing the said lever with respect to the frame, side bars, means connecting the longitudinal central bar of the main frame and the side bars, transverse bars arranged at opposite sides of the longitudinal central bar and between the same and the side bars, teeth carried by said bars, connections intermediate said bars and the lever, shafts journaled in the longitudinal central bar of the frame, shafts journaled in the side bars, knuckles interposed between the inner ends of the transverse bars and the longitudinal central bar, pintles pivotally connecting said knuckles to said shafts, pintles pivotally connecting the knuckles and the inner ends of the transverse bars and disposed at right angles to the first named pintles, knuckles carried at the outer ends of the transverse bars, pintles pivotally connecting said knuckles and the shafts in the side bars, and adjustable cables extending between and connected with the handle bars and the side bars.

3. In a harrow, the combination with a frame, and side bars; of transverse bars provided with teeth, combined rotary and knuckle joints intermediate the transverse bars and the frame, combined rotary and knuckle joints intermediate the transverse bars and the side bars, a lever mounted on the frame, means for adjustably fixing said lever, connections intermediate the transverse bars at opposite sides of the frame and the said lever, and means for adjustably connecting the side bars with the frame.

4. In a harrow, the combination with a frame, and side bars; of transverse bars equipped with soil-engaging means and interposed between and connected with the frame and the side bars and capable of turning about their axes between the frame and the side bars and also capable of swinging vertically and horizontally relative to the frame, and of swinging horizontally relative to the side bars, a lever mounted on the frame, means for adjustably fixing said lever, connections intermediate the transverse bars at opposite sides of the frame and said lever, and means for adjustably connecting the side bars with the frame.

5. In a harrow, the combination of a longitudinal central bar, a transverse shaft journaled therein, transverse bars disposed at opposite sides of said longitudinal central bar, knuckles interposed between the shaft and said transverse bar, pintles pivotally connecting the knuckles to said shaft, and pintles pivotally connecting the transverse bars to the knuckles and disposed at right angles to the first named pintles.

6. In a harrow, the combination of a longitudinal central bar, a transverse shaft journaled therein and having bifurcated ends, transverse bars disposed at opposite sides of the longitudinal central bar and having bifurcated ends, knuckles arranged in the bifurcations of the shaft and transverse bars, pintles pivotally connecting the shaft and the knuckles, and pintles pivotally connecting the knuckles and the transverse bars and disposed at right angles to the first named pintles.

7. In a harrow, the combination of a side bar, a transverse shaft journaled therein, a transverse bar, a knuckle carried by said transverse bar, and a pintle pivotally connecting said knuckle to the transverse shaft.

8. In a harrow, the combination of a side bar, a transverse shaft journaled therein and having a bifurcated inner end, a transverse bar, a knuckle carried by said bar and having a portion disposed in the bifurcation of the transverse shaft, and a pintle pivotally connecting said portion of the knuckle to the bifurcated portion of the shaft.

9. In a harrow, the combination with a frame, of transverse bars equipped with soil-engaging means and arranged at opposite sides of the frame, connections intermediate the transverse bars and the frame permitting turning of the bars about their axes and also permitting of vertical and horizontal swinging movements of the transverse bars relative to the frame, and means for adjustably fixing the positions of the transverse bars with respect to the frame.

In testimony whereof I have hereunto set my hand in presence of two subscribing witnesses.

JOHAN CHRISTIAN BAUMGARTEN.

Witnesses:
   G. E. RUHMANN,
   H. HORNER.